Sept. 15, 1925.
E. M. WEINBERG
COFFEE PERCOLATOR
Filed Nov. 11, 1924
1,553,732
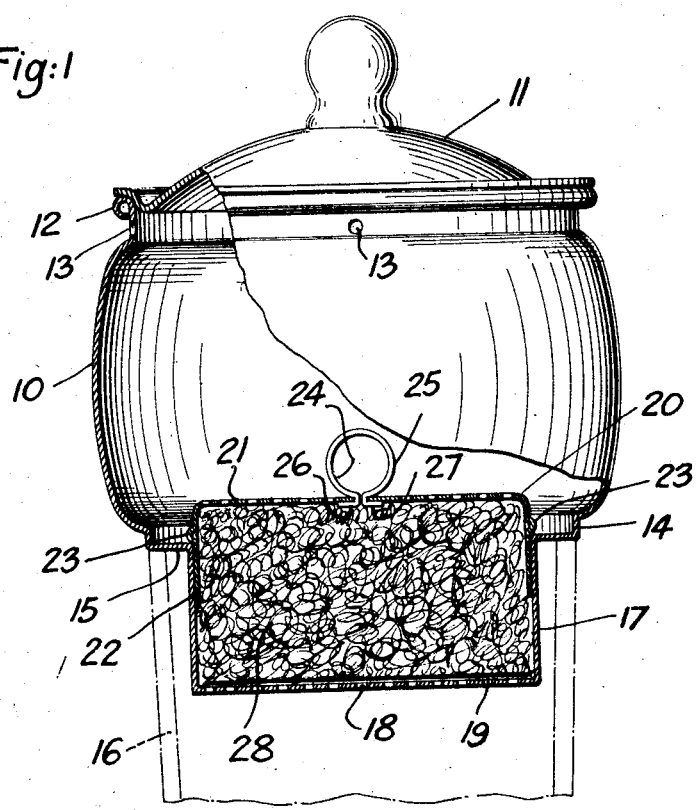
Fig:1
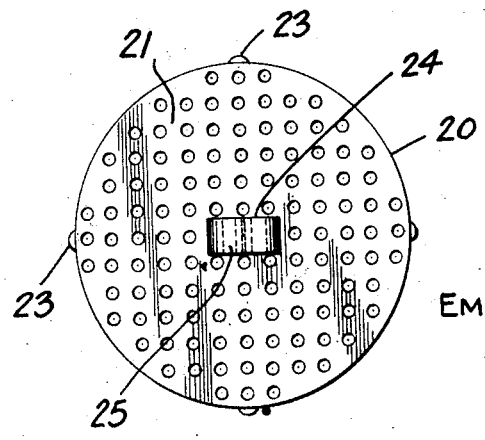
Fig:2
EMANUEL M. WEINBERG
INVENTOR
BY
ATTORNEY Patented Sept. 15, 1925.

1,553,732

UNITED STATES PATENT OFFICE.

EMANUEL M. WEINBERG, OF NEW YORK, N. Y.

COFFEE PERCOLATOR.

Application filed November 11, 1924. Serial No. 749,245.

*To all whom it may concern:*

Be it known that I, EMANUEL M. WEINBERG, a citizen of the United States, and a resident of New York, in the county of New York and State of New York, have invented certain new and useful Improvements in Coffee Percolators, of which the following is a specification.

This invention relates to coffee-percolators, particularly the kind which are used in connection with independent receiving means, such as cups, pitchers, glasses or other suitable containers.

It is one of the objects of the invention to provide water-spreading means within the percolator, whereby a charge of ground coffee is held with sufficient compactness in such a manner as to force the water which is used, to percolate evenly through the entire charge of coffee, in order to extract the maximum amount of strength therefrom.

Another object is to make these means readily adjustable within the percolator.

A still further object is to construct the percolator in a certain novel manner whereby a great economy in manufacture is achieved.

Still further objects and advantages of the invention will become apparent in the following specification and the accompanying drawings, in which—

Fig. 1 is a vertical sectional view through the percolator, partly in elevation, and Fig. 2 is a plan view of the water-spreading means.

Like characters of reference denote similar parts throughout the two views and the following specification.

10 is a receptacle of suitable shape, made of aluminum or other appropriate material. 11 is a cover for the receptacle resting on an open beaded edge 12. 13 are vent holes through the sides of the receptacle, preferably near its top, below the beaded edge 12.

The lower part of the receptacle 10 is reduced somewhat at 14, to provide a suitable seating surface 15 for it upon a container 16, shown fragmentarily and in dotted lines, in Fig. 1. 17 is a still further reduced portion at the center of the lower part of receptacle 10, cylindrical in shape, and provided with a perforated bottom 18. 19 is a filter paper placed over the perforated bottom 18.

20 is a removable water-spreader, made preferably of aluminum and of substantially cylindrical cup shape, open at its bottom, having a perforated top 21 and depending sides 22 which are flexible to a certain degree, for purposes mentioned hereafter, and which sides fit snugly within the reduced portion 17 at the bottom of the receptacle 10. 23 are outwardly disposed projections, near the top of the sides 22 of the water-spreader, which serve to limit its downward movement within the reduced portion 17 of the receptacle, by contacting with wall 15. 24 is a handle piece attached to the top of the water-spreader, made preferably of aluminum, consisting of a circular loop 25, the open ends of which are passed through a slot at the top of the spreader and bent over at 26 and 27, respectively.

28 is a charge of ground coffee, placed within the reduced portion 17 of the receptacle 10 and held there by the water-spreader 20.

The percolator operates as follows:

The charge of ground coffee is placed within the receptacle 10, above the filter paper 19, and the water-spreader 20 placed in position, as shown.

Attention is now called to the fact that the water-spreader 20 having its depending sides 22 made of aluminum or similar metal of very thin gauge, to make them flexible, can be bent outwardly by hand, in order to make them fit snugly within the reduced portion 17 of the receptacle, should through frequent handling the same work loose. This also serves to confine the charge of coffee within the reduced portion of the receptacle and the water-spreader. By this snug fit it is further possible to adjust the position of the spreader to a higher or lower one in proportion to the amount of coffee placed within the receptacle, whereby compactness of the charge is assured. Projections 23 serve to limit the lowermost adjustment only.

A quantity of boiling water is then poured into the receptacle. By reason of the perforated top 21 of the water-spreader, the water is distributed evenly over the charge of coffee below it and permitted to percolate slowly through it into the container 16, producing a coffee of rich aroma and strength, its clearness being further assured by its passage through the filter paper 19.

While I have shown and described a preferred embodiment of the invention, it is understood that various changes in the form, proportion and minor details of construction may be resorted to without departing from the principle or sacrificing any of the advantages, as defined in the appended claims.

What I claim as new and desire to secure by Letters Patent, is:

1. A coffee-percolator, having a receptacle provided with a reduced cylindrical lower portion integral therewith having a perforated bottom, and a removable water-spreader insertable through the said receptacle, having a perforated top and cylindrically disposed sides depending therefrom, the said sides frictionally engaging the said cylindrical lower portion of the receptacle, projections at the depending sides of the spreader near its top to limit its downward motion, and a handle loop fastened to its perforated top.

2. A coffee-percolator, having a receptacle provided with a reduced cylindrical lower portion non-separably connected therewith having a perforated bottom, and a removable water-spreader insertable through the said receptacle, having a perforated top and cylindrically disposed sides depending therefrom forming an inverted open cup, the said sides being made of flexible metal, slidably and frictionally engaging the said cylindrical lower portion of the receptacle to adjustably hold the said spreader within it, projections at the outside of the said sides, near the top thereof, to limit the downward travel of the spreader within the said lower portion of the receptacle, and a handle made of a flat strip of metal, arranged in loop form at the center of the said perforated top, its ends passed through a slot therein and bent over close to the lower face of the said perforated top, and a sheet of filter paper above the perforated bottom of the said reduced lower portion of the receptacle.

In testimony whereof I have hereunto set my hand.

EMANUEL M. WEINBERG.